United States Patent
Benites

(10) Patent No.: US 9,162,553 B2
(45) Date of Patent: Oct. 20, 2015

(54) SHADE DEVICE FOR CAR SIDE WINDOW

(76) Inventor: Joe Robert Benites, Rancho Cucamonga, CA (US)

( * ) Notice: Subject to any disclaimer, the term of this patent is extended or adjusted under 35 U.S.C. 154(b) by 13 days.

(21) Appl. No.: 12/691,672

(22) Filed: Jan. 21, 2010

(65) Prior Publication Data

US 2011/0042995 A1 Feb. 24, 2011

Related U.S. Application Data

(60) Provisional application No. 61/234,718, filed on Aug. 18, 2009.

(51) Int. Cl.
*B60J 3/00* (2006.01)
*B60J 1/20* (2006.01)

(52) U.S. Cl.
CPC .......................................... *B60J 1/20* (2013.01)

(58) Field of Classification Search
CPC ....... E06B 9/262; B60J 1/2086; B60J 1/2027; B60J 1/2011; B60J 1/2072; B60J 1/2091; B60J 1/00
USPC .......... 296/97.9, 97.8, 146.1, 152, 95.1, 97.1, 296/97.11, 97.2, 97.6, 97.7, 97.4; 160/370.21, 84.01, 263, 370.22
See application file for complete search history.

(56) References Cited

U.S. PATENT DOCUMENTS

| 1,986,700 | A | * | 1/1935 | Zimmerman | 49/63 |
|---|---|---|---|---|---|
| 2,267,542 | A | * | 12/1941 | Walz | 49/34 |
| 2,601,052 | A | * | 6/1952 | Ortleb | 296/153 |
| 2,625,217 | A | * | 1/1953 | Spiller et al. | 160/90 |
| 2,738,220 | A | * | 3/1956 | Simmons | 296/153 |
| 2,803,493 | A | * | 8/1957 | Haefliger | 296/153 |
| 2,877,049 | A | * | 3/1959 | Lucas | 296/153 |
| 3,282,623 | A | * | 11/1966 | Paro | 296/97.8 |
| 3,670,798 | A | * | 6/1972 | Hess et al. | 160/354 |
| 3,847,201 | A | * | 11/1974 | Kalish | 160/105 |
| 4,261,649 | A | * | 4/1981 | Richard | 359/614 |
| 4,331,359 | A | * | 5/1982 | Sheldon | 296/146.2 |
| 4,560,251 | A | * | 12/1985 | Murjahn | 359/608 |
| 4,743,061 | A | * | 5/1988 | Pompa | 296/152 |
| 4,773,697 | A | * | 9/1988 | Svensson | 296/152 |
| 4,805,957 | A | * | 2/1989 | Fletcher | 296/153 |
| 4,815,784 | A | * | 3/1989 | Zheng | 296/97.7 |
| 4,869,542 | A | * | 9/1989 | Lin | 296/97.8 |
| 4,944,548 | A | * | 7/1990 | Payne et al. | 296/97.8 |
| 5,002,327 | A | * | 3/1991 | Bickford | 296/97.7 |
| 5,022,701 | A | * | 6/1991 | Thompson, II | 296/152 |
| 5,033,786 | A | * | 7/1991 | Bickford | 296/97.9 |
| 5,042,550 | A | * | 8/1991 | Yee | 160/84.04 |
| 5,165,188 | A | * | 11/1992 | Tsiros | 49/63 |
| 5,333,665 | A | * | 8/1994 | Safar | 160/84.05 |

(Continued)

*Primary Examiner* — Kiran B Patel
(74) *Attorney, Agent, or Firm* — John R. Ross; John R. Ross, III

(57) ABSTRACT

A side window shade device for a vehicle. The shade device includes a bottom edge for sliding into the gap formed between the side door and the side door window. Compressive force between the side door and the side door window holds the shade device in place. Extending upward from the bottom edge is a shade device body. The body is of sufficient size to block sun rays from contacting the arm of someone sitting in a seat next to the side door. In a preferred embodiment the side door is the driver's side door of an automobile and the shade device blocks sun rays from hitting the arm of the driver. Also, the shade device is curved inward to cover the arm of the driver and provide effective viewing out of the side of the car.

4 Claims, 7 Drawing Sheets

(56) References Cited

U.S. PATENT DOCUMENTS

| | | | |
|---|---|---|---|
| 5,362,119 A * | 11/1994 | Rosentratter | 296/97.8 |
| 5,379,822 A * | 1/1995 | Lenetz | 160/370.21 |
| 5,524,694 A * | 6/1996 | Arapis | 160/370.21 |
| 5,605,370 A * | 2/1997 | Ruiz | 296/152 |
| 5,622,215 A * | 4/1997 | Lien | 160/370.21 |
| 5,634,682 A * | 6/1997 | Young | 296/97.8 |
| 5,730,484 A * | 3/1998 | Robinson | 296/97.6 |
| 6,047,762 A * | 4/2000 | Anderson | 160/370.22 |
| 6,120,085 A * | 9/2000 | Wooldridge | 296/97.8 |
| 6,332,644 B1 * | 12/2001 | Ito et al. | 296/215 |
| 6,394,530 B1 * | 5/2002 | Bittner | 296/152 |
| 6,397,504 B1 * | 6/2002 | McFetridge | 40/591 |
| 6,523,880 B1 * | 2/2003 | Yako | 296/97.1 |
| 6,682,121 B1 * | 1/2004 | Conforti | 296/97.5 |
| 6,705,381 B2 * | 3/2004 | Huang | 160/370.23 |
| 6,926,341 B1 * | 8/2005 | Addesso et al. | 296/153 |
| 7,131,683 B1 * | 11/2006 | Gong | 296/97.9 |
| 7,137,428 B1 * | 11/2006 | Alford | 160/105 |
| 7,234,754 B2 * | 6/2007 | Evans | 296/107.07 |
| 7,347,246 B2 * | 3/2008 | Ayran | 160/370.22 |
| 7,401,840 B2 * | 7/2008 | Schnoblen et al. | 296/143 |
| 7,717,158 B2 * | 5/2010 | Lekar et al. | 160/370.22 |
| 7,896,058 B2 * | 3/2011 | Hansen | 160/370.22 |
| 2001/0023745 A1 * | 9/2001 | Haid et al. | 160/105 |
| 2003/0214147 A1 * | 11/2003 | Mashburn | 296/97.9 |
| 2006/0082192 A1 * | 4/2006 | Dubay et al. | 296/214 |
| 2008/0216972 A1 * | 9/2008 | Starzmann et al. | 160/310 |
| 2008/0315615 A1 * | 12/2008 | Lekar | 296/97.4 |
| 2010/0194141 A1 * | 8/2010 | Varney et al. | 296/152 |
| 2011/0272105 A1 * | 11/2011 | Lin | 160/293.1 |

* cited by examiner

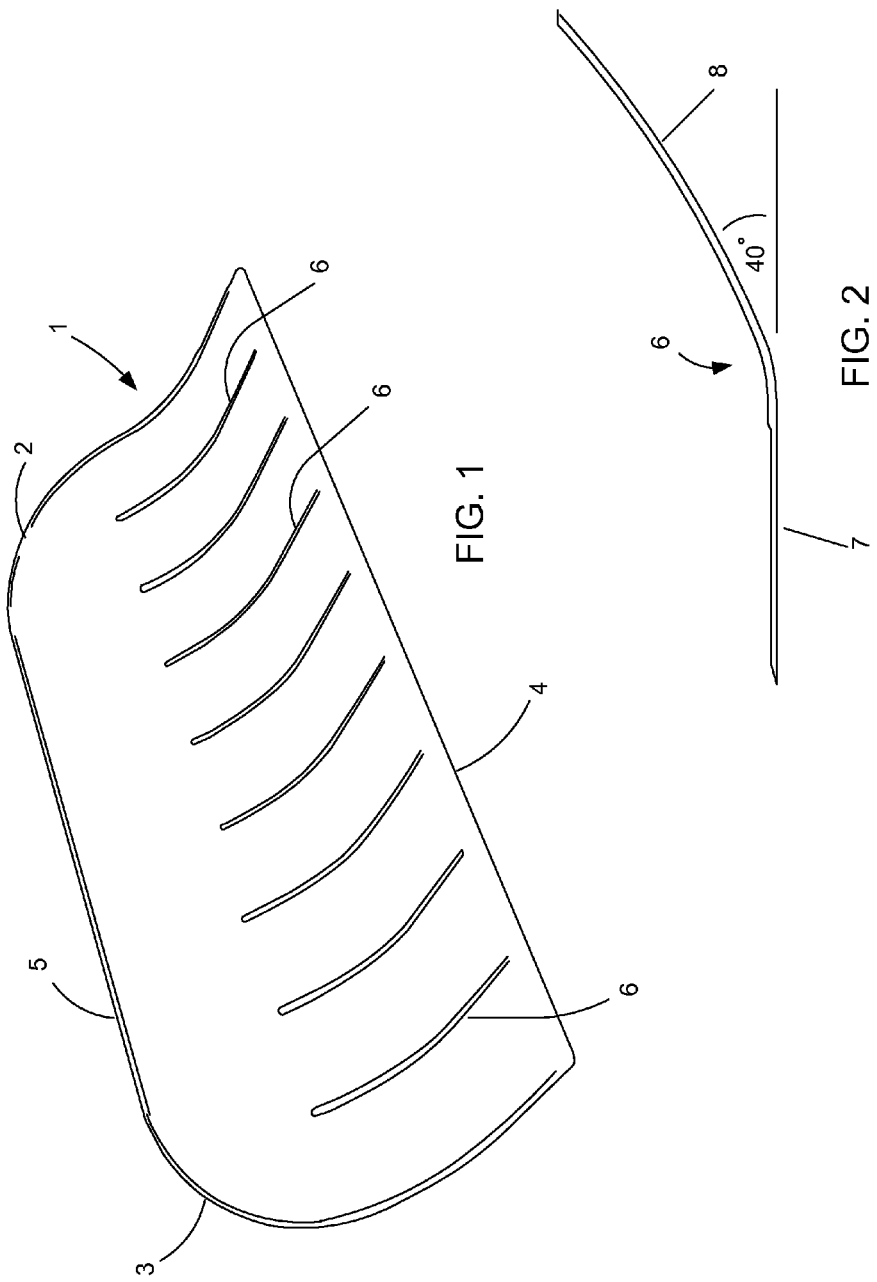

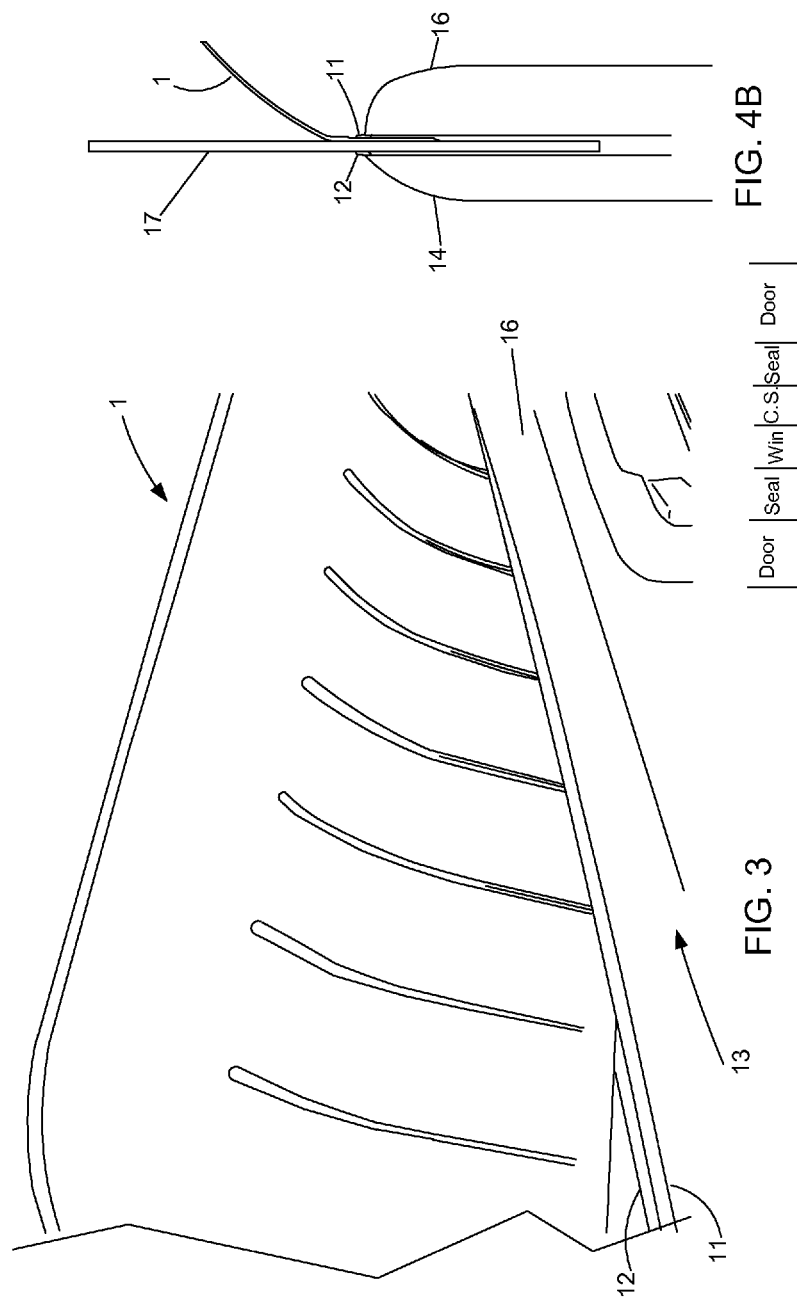
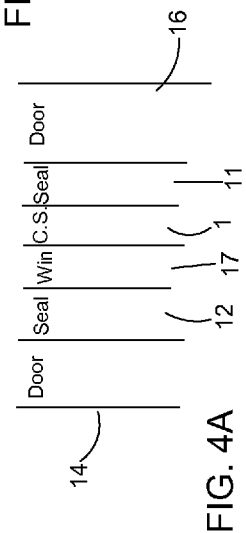

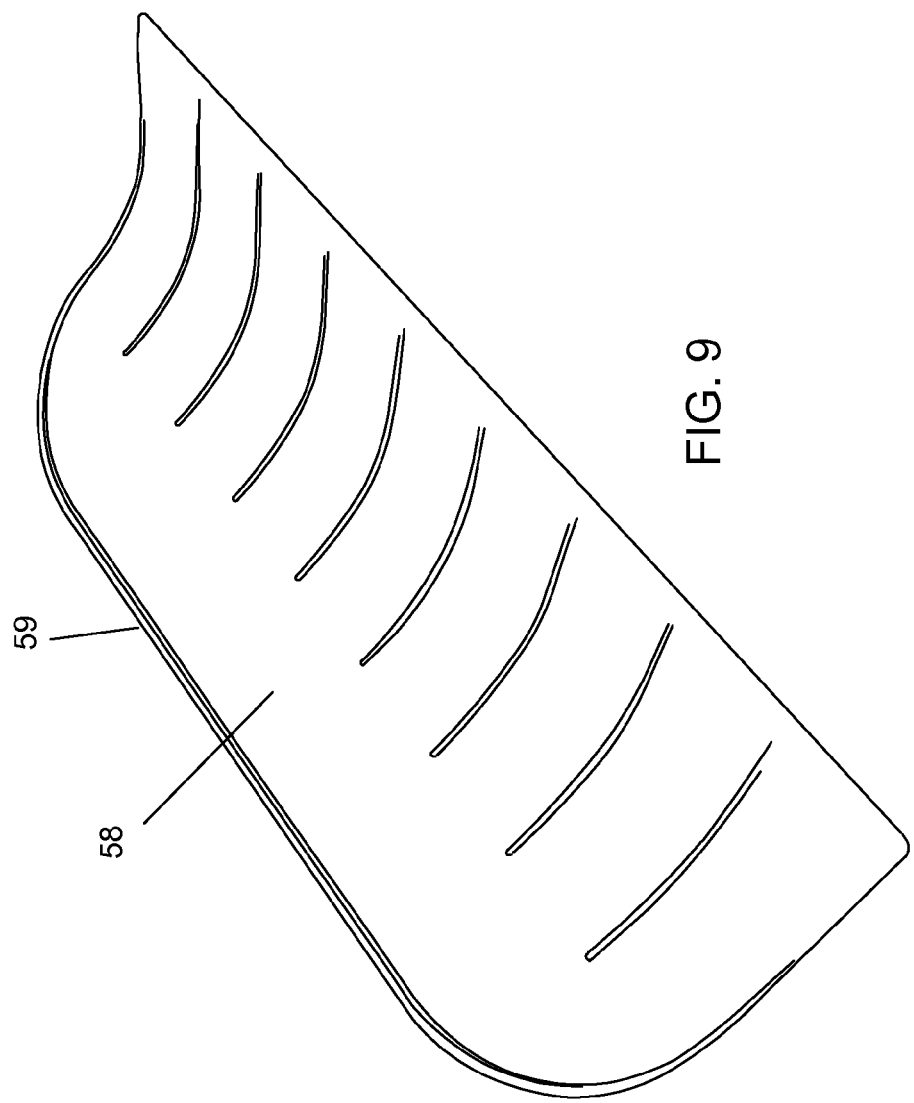

SHADE DEVICE FOR CAR SIDE WINDOW

The present invention relates to shade devices for vehicles, and in particular, to shade devices for automobiles. The present invention claims the benefit of Provisional Patent Application Ser. No. 61/234,718, filed Aug. 18, 2009.

BACKGROUND OF THE INVENTION

Excessive sun exposure is extremely dangerous. For example, too much sun exposure can cause painful sunburn, immune system suppression, skin rashes, premature aging of the skin and skin cancer. Yet even with modern understanding of the harmful effects of sun exposure, most people still do not protect themselves adequately from the sun.

During the summer a small percentage of the population may think to apply sunscreen if they know they will be spending significant time outdoors. However, most of these people will not apply sunscreen if they think they are going to be indoors or in a covered area, such as their automobile.

The Automobile Provides a False Sense of Security from Sun Damage

It is true that the clear window glass found in automobiles blocks UV-B rays (UV-B rays cause sunburn). However, unless the window glass is specially coated or tinted, the car window does not block UV-A rays. UV-A rays are rays that can tan the skin. UV-A rays are also very dangerous because these are the rays that penetrate deep and can cause skin damage, possibly even skin cancer.

Automobile drivers are particularly vulnerable to UV-A exposure. The driver of a car may feel a false sense of security and may feel that just because he is in the car that the sun cannot hurt him. He therefore will not apply sunscreen. Furthermore, a significant percentage of drivers are in the habit of resting their left arm high up on the door immediately adjacent to the window. This allows for high exposure of their arm to the sun and increases their risk of developing skin damage, such as skin cancer. Also, the driver may decide to lower his window. This now will allow harmful UV-B rays to contact his arm and he may suffer painful sunburn.

Injection Molding Process

The process of injection molding is well known in the prior art. Injection molding is a manufacturing process for producing parts from both thermoplastic and thermosetting plastic materials. A prior art injection molding machine is shown in FIG. 8. Plastic pellets 101 are fed into hopper 102. Reciprocating screw 103 conveys the pellets to the right through barrel 104. Barrel 104 is heated by heater 105. The heat from barrel 104 and the motion of screw 103 causes the pellets to melt. The melted polymer is then forced into mold cavity 107 via nozzle 106. The part is then formed and cooled within mold 8 and it hardens to the configuration of the mold cavity. Moveable platen 109 moves to the right so that the mold opens. The hardened part is then ejected.

What is needed is a better shade device for a car.

SUMMARY OF THE INVENTION

The present invention provides a side window shade device for a vehicle. The shade device includes a bottom edge for sliding into the gap formed between the side door and the side door window. Compressive force between the side door and the side door window holds the shade device in place. Extending upward from the bottom edge is a shade device body. The body is of sufficient size to block sun rays from contacting the arm of someone sitting in a seat next to the side door. In a preferred embodiment the side door is the driver's side door of an automobile and the shade device blocks sun rays from hitting the arm of the driver. Also, the shade device is curved inward to cover the arm of the driver and provide effective viewing out of the side of the car.

BRIEF DESCRIPTION OF THE DRAWINGS

FIG. 1 shows a perspective view of a preferred embodiment of the present invention.

FIG. 2 shows a preferred rib.

FIG. 3 shows a preferred car shade being inserted into a gap between the car window and the car door.

FIG. 4A shows a simplified top view of a car shade inserted into a car door.

FIG. 4B shows a simplified side view of a car shade inserted into a car door.

FIG. 9 shows another preferred embodiment of the present invention.

DETAILED DESCRIPTION OF THE PREFERRED EMBODIMENTS

Figure 5:
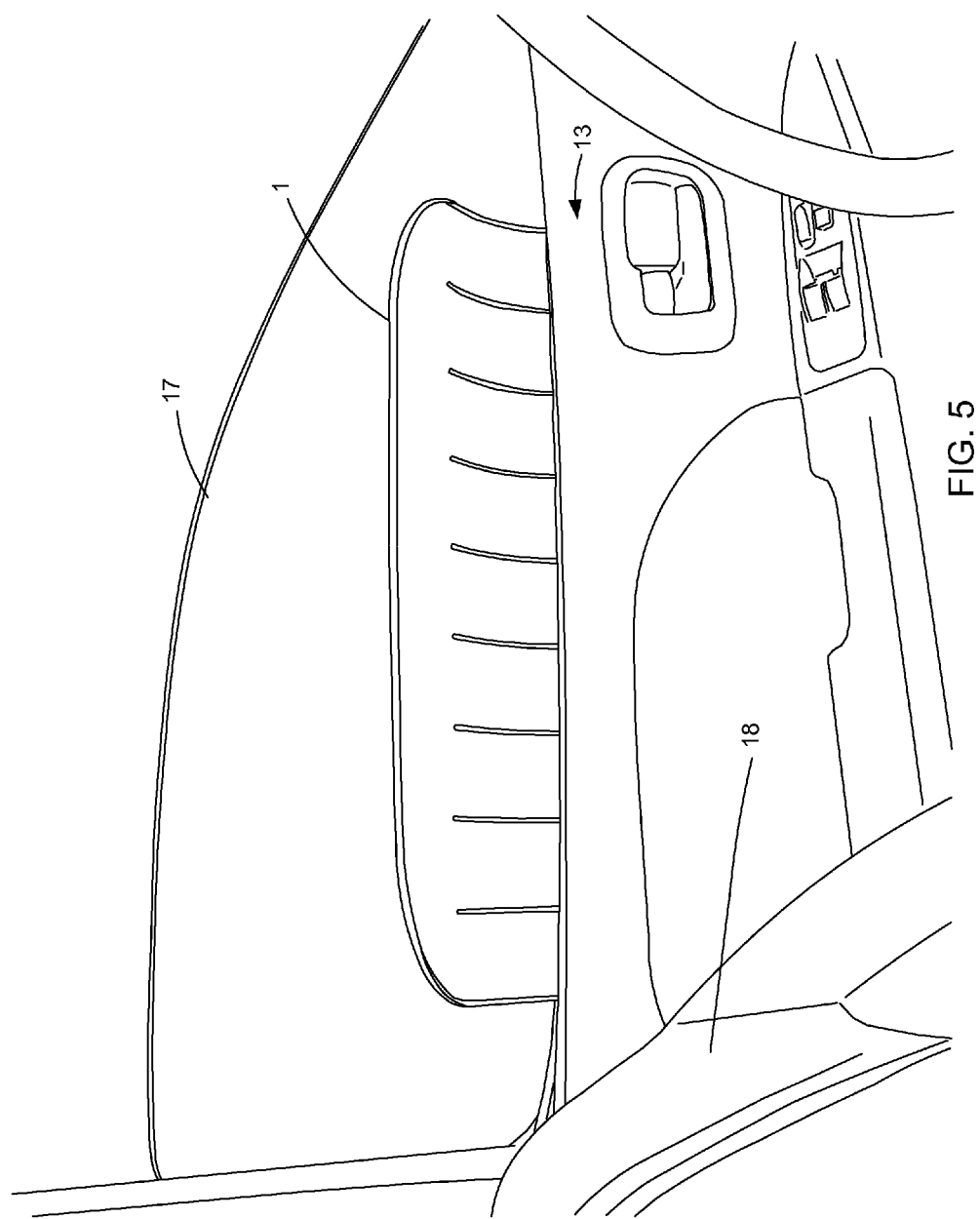
FIG. 5 shows a perspective view of a car shade inserted between the car window and the car door.

FIGS. 3, 4A-4B and 6 show a preferred embodiment of the present invention. Car shade 1 is inserted into a gap between window 17 and inner door half 16 of car driver's side door 13. In a preferred embodiment, window seal 11 presses tight against car shade 1 to hold it tightly in place. The driver is able rest his arm comfortably onto inner door half 16 adjacent to car shade 1. Car shade 1 protects his arm from any unwanted tanning, such as a farmer's tan, and also protects his arm from dangerous exposure to harmful UV rays from the sun. While car shade 1 is protecting his arm, the driver is able to safely operate the vehicle and have unobstructed viewing of driver's side view mirror 20. The driver is able to view outside through the driver's window while simultaneously being shaded by car shade 1. Car shade 1 can be used if the window is up all the way, down all the way or if it is partially up. On some cars car shade 1 will remain in place automatically as the window is raised or lowered. On other cars where there is greater friction force between window and car shade 1, the driver can easily hold car shade 1 steady to overcome the friction force as the window is raised and lowered.

FIG. 1 shows a first preferred embodiment of the present invention. Preferably, car shade 1 is fabricated from flexible polypropylene using an injection molding process similar to that described in the Background section above. Ideally, the material is of sufficient stiffness so as to maintain its shape, yet flexible enough so that it will not break if overly bent or twisted during use.

In a preferred embodiment, car shade 1 is curved inward at an angle of approximately 40 degrees. The curve of car shade 1 allows it to cover over the top of the driver's arm to reduce exposure of the arm when the sun is shining through the car. The curvature allows the car shade 1 to be constructed to a lower height to block vertical or near vertical sunlight from entering the vehicle. Another reason for the curve is to reduce obstructed view out the side of the car and to make it easier to view side view minor 20. Hence, the driver is able to view traffic out the side of the vehicle and in the blind spot without compromising the shading properties of the car shade 1.

In a preferred embodiment, car shade 1 measures approximately 21 inches along its bottom edge 4. Car shade 1 includes rounded corners 2 and 3 along its top edge. Flat portion 5 along its top edge measures approximately 13½ inches. Car shade 1 is approximately 1/16 inch thick throughout with the exception of lower edge 4. Lower edge 4 is preferably tapered to an approximately flat edge which allows for easy insertion of car shade 1 into the driver's side window.

Preferably, car shade 1 includes multiple ribs 6 for extra strength. FIG. 2 shows a side view of rib 6. Lower portion 7 extends approximately 1/16 inch upward and upper portion 8 extends approximately 1/8 inch upward from the top surface of car shade 1.

Preferred Method for Insertion

To easily insert car shade 1 into driver's door 13, the user first completely lowers his window. Then, the user inserts car shade 1 at and angle (FIG. 3) into the gap opening between window seal 11 and window seal 12.

FIG. 4A shows a simplified top view of door 13 and FIG. 4B shows a simplified side view of door 13. Door 13 includes outer door half 14 and inner door half 16. Window seal 12 is attached to outer door half 14 and window seal 11 is attached to inner door half 16. Seals 11 and 12 normally press tight against window 17 when window 17 is raised. When window 17 is lowered, a gap forms between seals 12 and 11. To install car shade 1, the user inserts car shade 1 into the gap so that car shade 1 is between window 17 and inner door half 16. Seal 11 presses tightly against car shade 1 to form a seal and to hold car shade 1 securely in place against window 17.

In FIG. 5, the user has inserted car shade 1 into door 13. Window 17 has been raised approximately half way up, but the window is still open. The user can now sit at seat 18 and adjust the position of car shade 1 as appropriate. He can press upward on car shade 1 to make it higher or press downward on car shade 1 to make it lower. He can push it or pull it to move it forward or rearward.

Figure 6:
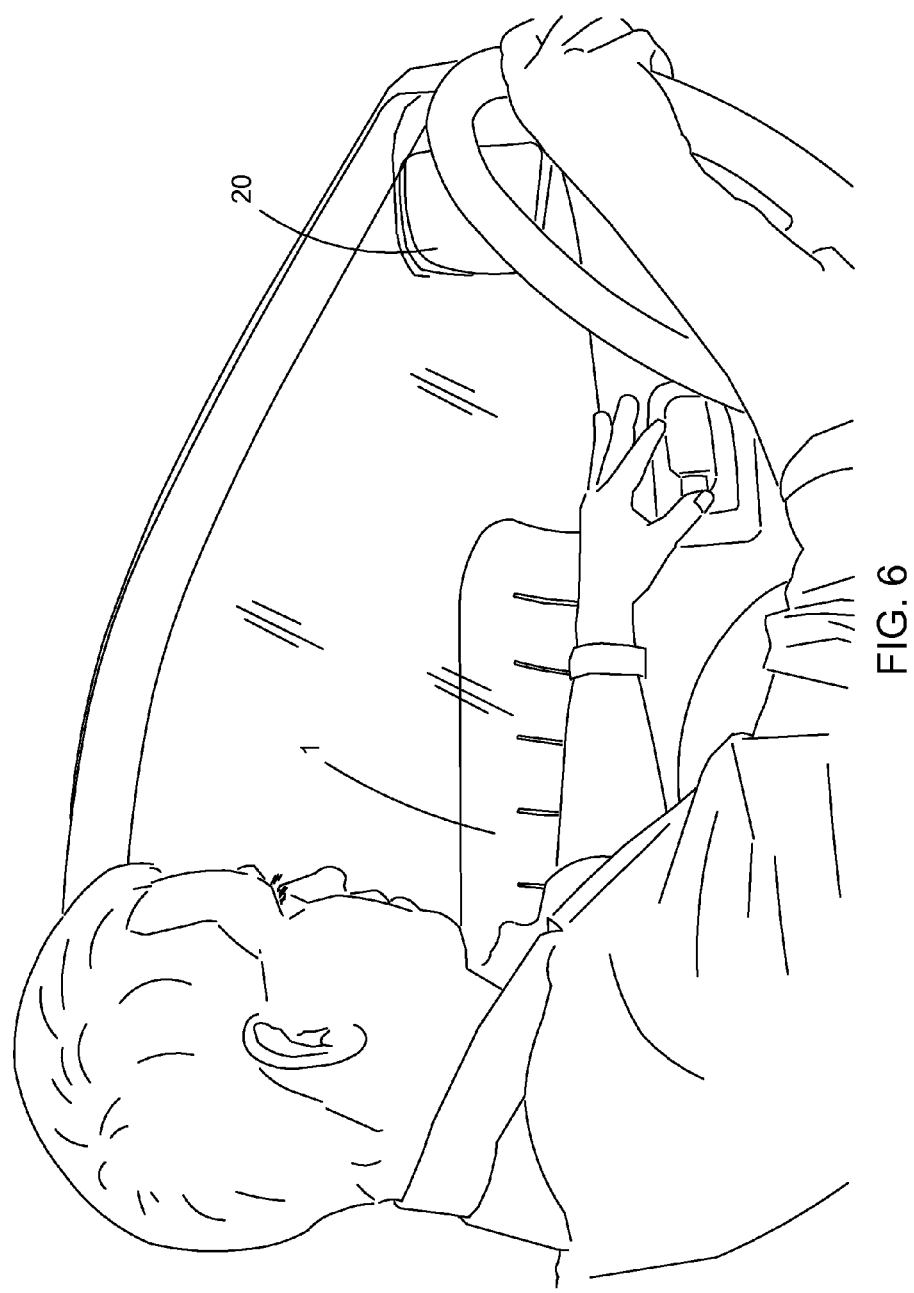
FIG. 6 shows a perspective view of a car shade inserted into the car window while still allowing unobstructed viewing of the driver's side view mirror.

FIG. 6 shows another view of car shade 1 inserted into door 13. As the user adjusts the position of car shade 1, it is important that he is able to have an easy view of driver's side minor 20. Accordingly, the user moves car shade 1 rearward and downward until unobstructed viewing of mirror 20 is achieved.

Figure 7:
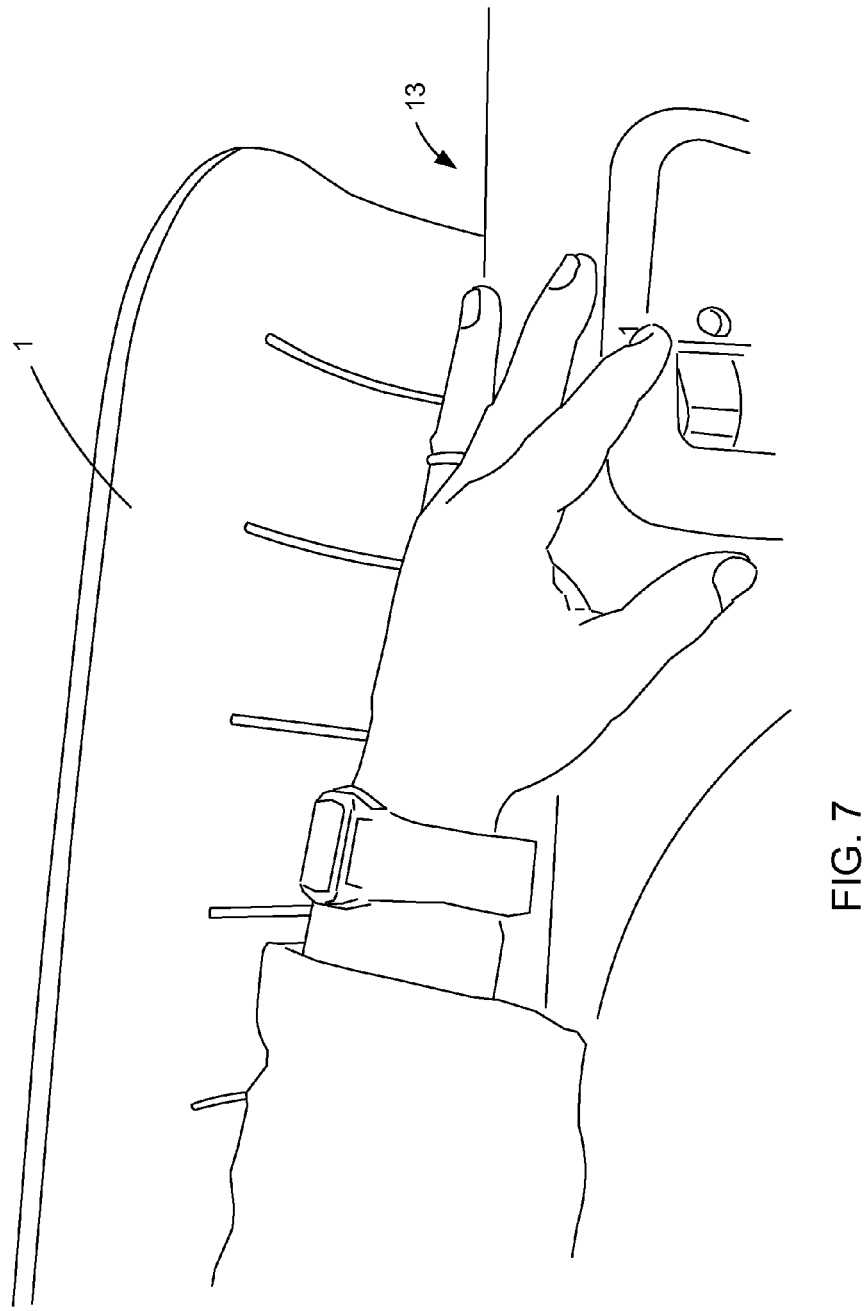
FIG. 7 shows a perspective view of the car shade covering the driver's arm and blocking sun rays from contacting the driver's arm.
Figure 8:
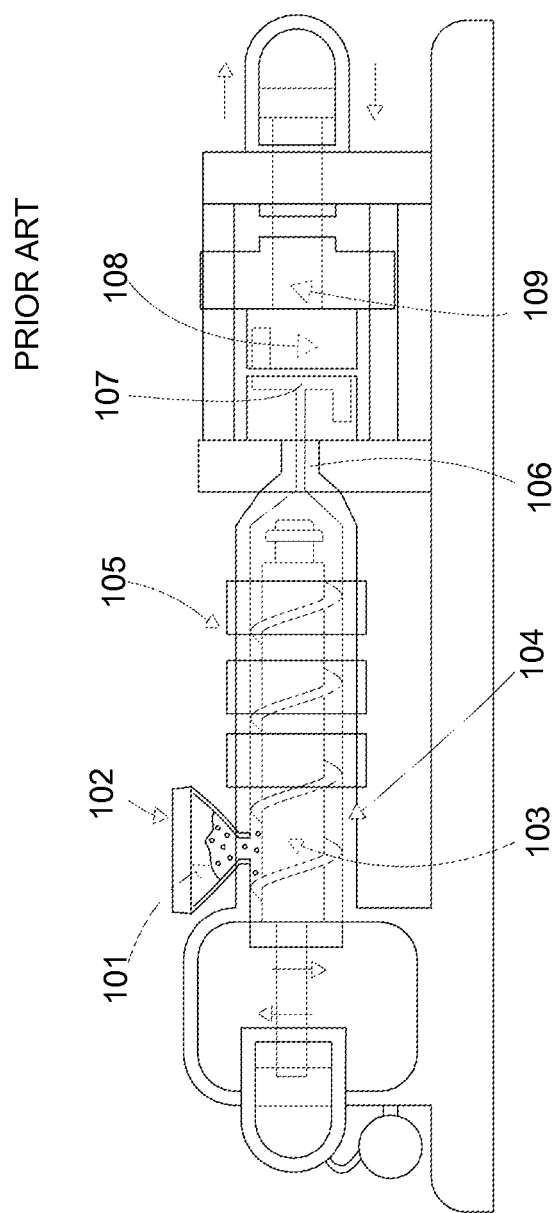
FIG. 8 shows a prior art injection molding machine.

Once car shade 1 is appropriately positioned, the user can then rest his arm on the top of door 13 and under car shade 1, as shown in FIG. 7. Car shade 1 functions to prevent dangerous sun exposure to the driver's arm and hand.

---

While the present invention has been described in terms of preferred embodiments, the reader should consider these described embodiments only as particular embodiments. Many other embodiments are possible. For example, even though the figures referred to above show the driver with his arm resting high on the door adjacent to car shade 1, it should be understood that car shade 1 provides shade to the driver's arm even if it is on the steering wheel or if it is located on the normal door arm rest. Also, although it was stated above that a preferred method of installing car shade 1 calls for the user to first lower the window, it should be understood that in some cars the gap between the window and the window seal is sufficiently large so that it is unnecessary to lower the window prior to inserting car shade 1 into the gap. FIG. 9 shows another preferred embodiment having car shade 58 that includes a thicker outer rim 59 for extra strength. Also, it should be noted here that car shade 1 can be fabricated from a variety of materials, such as other strong, hard flexible materials such as polyurethane. Also, car shade 1 can be made in various shapes and sizes and that the specific optimum size and shape may depend upon the specific needs of the driver. It should also be noted that while car shade 1 is shown installed in the front side window of a vehicle of a left hand drive vehicle, it is contemplated that the car shade can be configured, and or installed on any side windows of a vehicle (including the passenger seat window or a rear window seat. Also, although the above preferred embodiments discussed utilizing the present invention with an automobile or car, it should be understood that car shade 1 could be utilized in a variety of vehicle types. For example, to name a few, car shade 1 could be utilized in big-rig truck, a sports utility vehicle, an RV (recreational vehicle), a van or a minivan. Therefore, the reader should determine the scope of the present invention by the claims and their legal equivalents.

What is claimed is:

1. A side window shade device for a vehicle having a driver's side rear view mirror, a driver's side door and an inner window seal attached to an inside side of the side door and a side door window said shade device comprised of:
    A) an upper portion and a lower portion, both portions being comprised of an injection molded flexible material having sufficient stiffness to maintain its shape yet flexible enough to avoid breaking if bent or twisted during use, wherein:
        1) the lower portion of the shade device being generally flat except for a plurality of ribs and having a thickness, including the ribs, that permits the lower portion to slide between the side door window and the inner window seal with the plurality of ribs extending beyond the lower portion along at least a portion of the upper portion, and
        2) the upper portion of the shade device, when the lower portion of the shade device installed between the window and the inner window seal, is curved inwardly toward the driver to a limited extent so as to protect only the portions of the driver's arm and hand that would otherwise be exposed to harmful sun rays and to allow the driver an unobstructed view of the driver side rear view mirror, said upper portion comprising the ribs extending from the lower portion with said ribs being thicker in the upper portion than the lower portion to provide additional strength in the upper portion.
    wherein a bottom edge of the lower portion is tapered so to permit the shade device be easily slid into a gap between the side door window and the inner window seal and the shade device is held in place by compressive force between the inner window seal and the window.

2. The side window shade device as in claim 1 wherein said shade device is polypropylene.

3. The side window shade device as in claim 1, wherein the curvature of said curved shade device body prevents said curved shade device body from sliding downward into the gap formed between said side door and said side door window.

4. A method of protecting a driver's arm from harmful UV rays comprising the steps of:

A) inserting a side window shade device for a vehicle having a driver's side door and a side door window and an inner window seal attached to an inside side of the side door and positioned between the side door and said side door window, said shade device comprised of an injection molded flexible material having a plurality of ribs and sufficient stiffness to maintain its shape yet flexible enough to avoid breaking if bent or twisted during use, said shade device having:
  1) a bottom edge adapted to slide into gap formed between said inner window seal and said side door window, where compressive force between said side door and said side door window holds said shade device in place and,
  2) a curved shade body extending upward from said bottom edge a limited extent so as to allow a driver and unobstructed view of a driver's side real view mirror and curved inward towards the interior of the vehicle and at least partially over a driver's arm when the arm is resting on an inner portion of said side door of the vehicle, said shade body being adapted to protect only portions of the driver's arm and hand from harmful UV rays and
B) adjusting the shade device so as to assure the unobstructed view of a driver's side rear view mirror.

* * * * *